United States Patent
Oshima et al.

(10) Patent No.: US 8,142,082 B2
(45) Date of Patent: Mar. 27, 2012

(54) OPTICAL ASSEMBLY OPTICALLY COUPLING AN OPTICAL FIBER AND A SEMICONDUCTOR DEVICE

(75) Inventors: Isao Oshima, Tokyo (JP); Atsushi Kawamura, Tokyo (JP); Toshitsugu Uesugi, Tokyo (JP); Tadayoshi Hata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 297 days.

(21) Appl. No.: 12/420,862

(22) Filed: Apr. 9, 2009

(65) Prior Publication Data

US 2009/0263087 A1   Oct. 22, 2009

(30) Foreign Application Priority Data

Apr. 16, 2008  (JP) .................................. 2008-106901

(51) Int. Cl.
  *G02B 6/36* (2006.01)
  *G02B 6/42* (2006.01)
(52) U.S. Cl. ................. 385/88; 385/92; 385/93
(58) Field of Classification Search .............. 385/93
  See application file for complete search history.

(56) References Cited

U.S. PATENT DOCUMENTS

| | | | | |
|---|---|---|---|---|
| 5,533,159 A | * | 7/1996 | Okochi et al. | ............ 385/93 |
| 6,793,406 B1 | * | 9/2004 | Edwards et al. | ............ 385/88 |
| 6,999,644 B1 | * | 2/2006 | Lebby et al. | ............ 385/14 |
| 7,513,696 B2 | | 4/2009 | Wada et al. | |
| 7,572,068 B2 | * | 8/2009 | Nagano et al. | ............ 385/93 |
| 2003/0091304 A1 | | 5/2003 | Tonai et al. | |

FOREIGN PATENT DOCUMENTS

| | | |
|---|---|---|
| CN | 1867848 A | 11/2006 |
| JP | 64-052103 A | 2/1989 |
| JP | 01-109313 A | 4/1989 |
| JP | 02-050110 A | 2/1990 |
| JP | 03-158804 A | 7/1991 |
| JP | 2002-131572 | 5/2002 |
| JP | 2005-122086 | 5/2005 |
| JP | 2006-154301 | 6/2006 |
| JP | 2007-041516 | 2/2007 |
| JP | 2007-155920 A | 6/2007 |

OTHER PUBLICATIONS

State Intellectual Property Office of the People's Republic of China, English language translation of Chinese Office Action (Sep. 21, 2011).
Office Action in Japanese Patent Application No. 2008-106901 dated Dec. 16, 2011.

* cited by examiner

*Primary Examiner* — Omar Rojas
(74) *Attorney, Agent, or Firm* — Leydig, Voit & Mayer, Ltd.

(57) ABSTRACT

An optical receptacle which couples a connector ferrule in which an optical fiber is inserted and an optical semiconductor package. The optical receptacle comprises: a precise sleeve which holds the connector ferrule; a receptacle body including a connection portion connected to the optical semiconductor package, a cylindrical portion in which the precise sleeve is inserted; a partition portion located between the connection portion and the cylindrical portion; and a transparent member confined in a region between an inner end portion of the precise sleeve and the partition portion, without being fixed.

16 Claims, 6 Drawing Sheets

US 8,142,082 B2

OPTICAL ASSEMBLY OPTICALLY COUPLING AN OPTICAL FIBER AND A SEMICONDUCTOR DEVICE

BACKGROUND OF THE INVENTION

1. Field of the Invention

The present invention relates to an optical receptacle for coupling a connector ferrule in which an optical fiber is inserted and an optical semiconductor package to each other and, more particularly, to a highly reliable optical receptacle capable of obtaining a low-reflection condition with stability.

2. Background Art

An optical receptacle is used to couple a connector ferrule in which an optical fiber is inserted and an optical semiconductor package in which a photodiode (PD) chip or a laser diode (LD) chip is mounted.

In conventional optical receptacles, light emitted from a connector ferrule is directly coupled to a PD chip in an optical semiconductor package. However, the tip of the connector ferrule is floating in the air and there is, therefore, a problem that light traveling from a transmitter via the connector ferrule is largely reflected to the transmitter side at the tip end surface of the connector ferrule due to the difference between the refractive indices of air and the optical fiber.

In recent years, an optical receptacle has been proposed in which the tip end surface of a connector ferrule is brought into contact with a transparent plane-parallel plate (see, for example, Japanese Patent Laid-Open Nos. 1-109313 and 64-52103). The reflection of light at the tip end surface of a connector ferrule can be reduced in this way.

SUMMARY OF THE INVENTION

When the transparent member is fixed on the receptacle body with an adhesive, there is a possibility of the transparent member being fixed while being inclined with respect to the receptacle body. In such a case, a gap is formed between the connector ferrule and the transparent member to cause reflection of light at the boundary therebetween. Also, in some cases, an adhesive overflows to interfere with the optical path. Further, there is a possibility of the transparent member and the receptacle body being separated from each other at the junction therebetween due to the difference between their expansion coefficients of the transparent member and the receptacle body. Low-reflection optical receptacles have been obtained under ideal conditions in prototype manufacturing but trials to mass-produce low-reflection optical receptacles with stability has ended in failure due to variation in the angle at which the transparent member is fixed.

In view of the above-described problems, an object of the present invention is to provide a highly reliable optical receptacle capable of obtaining a low-reflection condition with stability.

According to one aspect of the present invention, an optical receptacle which couples a connector ferrule in which an optical fiber is inserted and an optical semiconductor package, the optical receptacle comprises: a precise sleeve which holds the connector ferrule; a receptacle body having a connection portion connected to the optical semiconductor package, a cylindrical portion in which the precise sleeve is inserted and a partition portion provided between the connection portion and the cylindrical portion; and a transparent member confined in a region between an inner end portion of the precise sleeve and the partition portion without being fixed.

The present invention improves the reflection characteristics and reliability of an optical receptacle.

Other and further objects, features and advantages of the invention will appear more fully from the following description.

DETAILED DESCRIPTION OF THE PREFERRED EMBODIMENTS

First Embodiment

Figure 1:
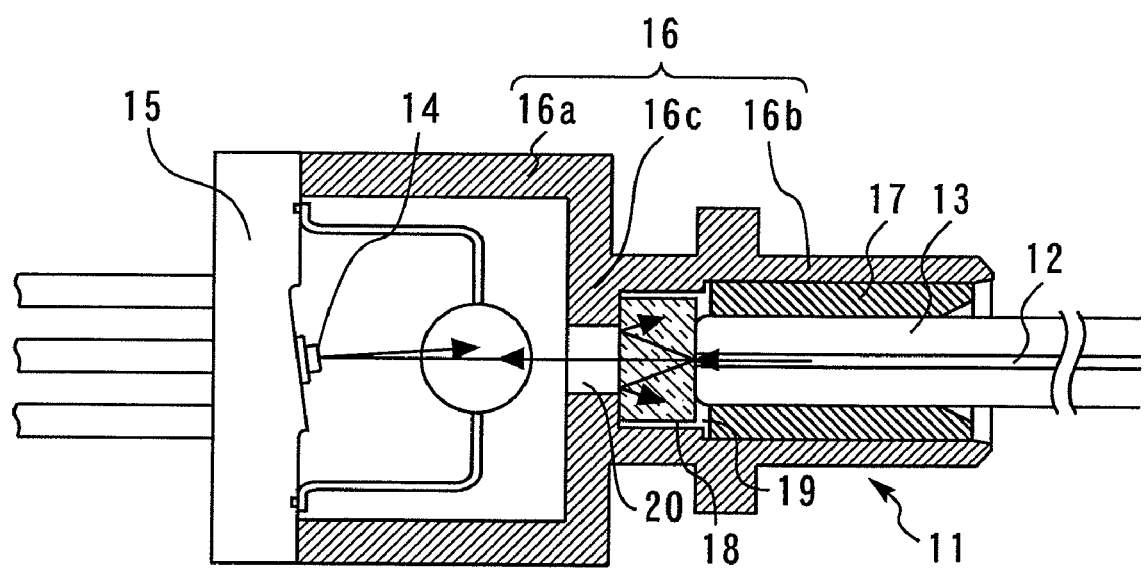
FIG. 1 is a sectional view of an optical receptacle according to a first embodiment of the present invention.

FIG. 1 is a sectional view of an optical receptacle according to a first embodiment of the present invention. The optical receptacle 11 couples a connector ferrule 13 in which an optical fiber 12 is inserted and an optical semiconductor package 15 in which a photodiode (PD) chip 14 is mounted while maintaining the connector ferrule 13 and the optical semiconductor package 15 face to face.

A receptacle body 16 has a connection portion 16a connected to the optical semiconductor package 15, a cylindrical portion 16b in which a precise sleeve 17 is inserted, and a partition portion 16c provided between the connection portion 16a and the cylindrical portion 16b. The precise sleeve 17 holds the connector ferrule 13. The precise sleeve 17 is generally cylindrical and the inside diameter of the precise sleeve 17 is approximately equal to the outside diameter of the connector ferrule 13. The receptacle body 16 and the precise sleeve 17 are fixed to each other by press fitting, bonding with an adhesive or the like. The receptacle body 16 is made of, for example, a metal or a resin.

An optically transparent plane-parallel plate 18 (transparent member) is confined in a region 19 between an inner end portion of the precise sleeve 17 and the partition portion 16c without being fixed. In the partition portion 16c, an opening 20 having a diameter smaller than that of the outside shape of the transparent plane-parallel plate 18 is provided about an extension of the optical axis of the connector ferrule 13 inserted in the precise sleeve 17. The partition portion 16c has a surface perpendicular to the inner wall surface of the cylindrical portion 16*b*. Since the diameter of the outside shape of the transparent plane-parallel plate 18 is larger than the inside diameter of the precise sleeve 17 and the diameter of the opening 20 of the partition portion 16*c*, the transparent plane-parallel plate 18 does not escape out of the region 19.

When the connector ferrule 13 is inserted in the precise sleeve 17, the tip end of the connector ferrule 13 is pressed against the transparent plane-parallel plate 18. Since the transparent plane-parallel plate 18 is not fixed, the transparent plane-parallel plate 18 moves in the region 19 in which it is confined. The transparent plane-parallel plate 18 is then pinched between the partition portion 16*c* and the connector ferrule 13 to be made parallel to the partition portion 16*c* with high accuracy. Because the connector ferrule 13 is inserted parallel to the inner wall of the cylindrical portion 16*b* by using the precise sleeve 17, the connector ferrule 13 is perpendicularly pressed against the plane-parallel plate 18. Thus, the tip end of the connector ferrule 13 can be brought into contact with the transparent plane-parallel plate 18 with reliability. As a result, the reflection at the plane of contact between the connector ferrule 13 and the transparent plane-parallel plate 18 can be limited. Also, since the transparent plane-parallel plate 18 is not fixed with an adhesive or the like, the transparent plane-parallel plate 18 can be made parallel to the surface of the partition portion 16*c* with accuracy and the optical receptacle is free from the problems including interference of an overflow of an adhesive with the optical path and separation, thus improving the reliability.

In this state, light from a transmitter enters the transparent plane-parallel plate 18 by traveling through the connector ferrule 13. Light traveling out of the optical fiber 12 in the connector ferrule 13 spreads in the transparent plane-parallel plate 18. Light in the vicinity of the optical axis of the connector ferrule 13 exits the transparent plane-parallel plate 18, travels through the opening 20 of the partition portion 16*c* and enters the PD chip 14 in the optical semiconductor package 15. On the other hand, the light spreading outward from the optical axis in the transparent plane-parallel plate 18 is reflected at the interface between the air existing in the opening 20 and the transparent plane-parallel plate 18 due to the difference in refractive indices therebetween. The reflected light travels further outward from the optical axis. Thus, the amount of return of light to the transmitter side is reduced.

The PD chip 14 is obliquely mounted. Therefore, reflection light from the PD chip 14 travels in an oblique direction. Prevention of return of light to the transmitter side is thereby enabled.

The precise sleeve 17 is used to reduce wobbling of the connector ferrule 13 at the time of insertion. The inclination of the connector ferrule 13 inserted in the precise sleeve 17 is thereby reduced to achieve high insertion/draw-out reproducibility. Also, the transparent plane-parallel plate 18 can be set perpendicular to the optical axis of the connector ferrule 13 with high accuracy by pressing the transparent plane-parallel plate 18 against the surface of the partition portion 16*c* perpendicular to the inner wall surface of the cylindrical portion 16*b*. More specifically, the difference between the direction perpendicular to the plane of the transparent plane-parallel plate 18 and the optical axis of the connector ferrule 13 can be set equal to or smaller than 0.2° to enable the tip end of the connector ferrule 13 to be brought into contact with the transparent plane-parallel plate 18 with reliability even after repeating inserting/drawing out the connector ferrule 13. As a result, the amount of return of light to the transmitter side at the plane of contact between the connector ferrule 13 and the transparent plane-parallel plate 18 is reduced.

The transparent plane-parallel plate 18 is easily to work and is made at a low cost. Therefore, a large number of low-reflection optical receptacles such as described above can be manufactured at a low cost. The material of the transparent plane-parallel plate 18 is quartz glass, the same as that of the optical fiber 12 inserted in the connector ferrule 13. This material enables prevention of reflection of light at the plane of contact between the transparent plane-parallel plate 18 and the optical fiber 12.

Figure 2:
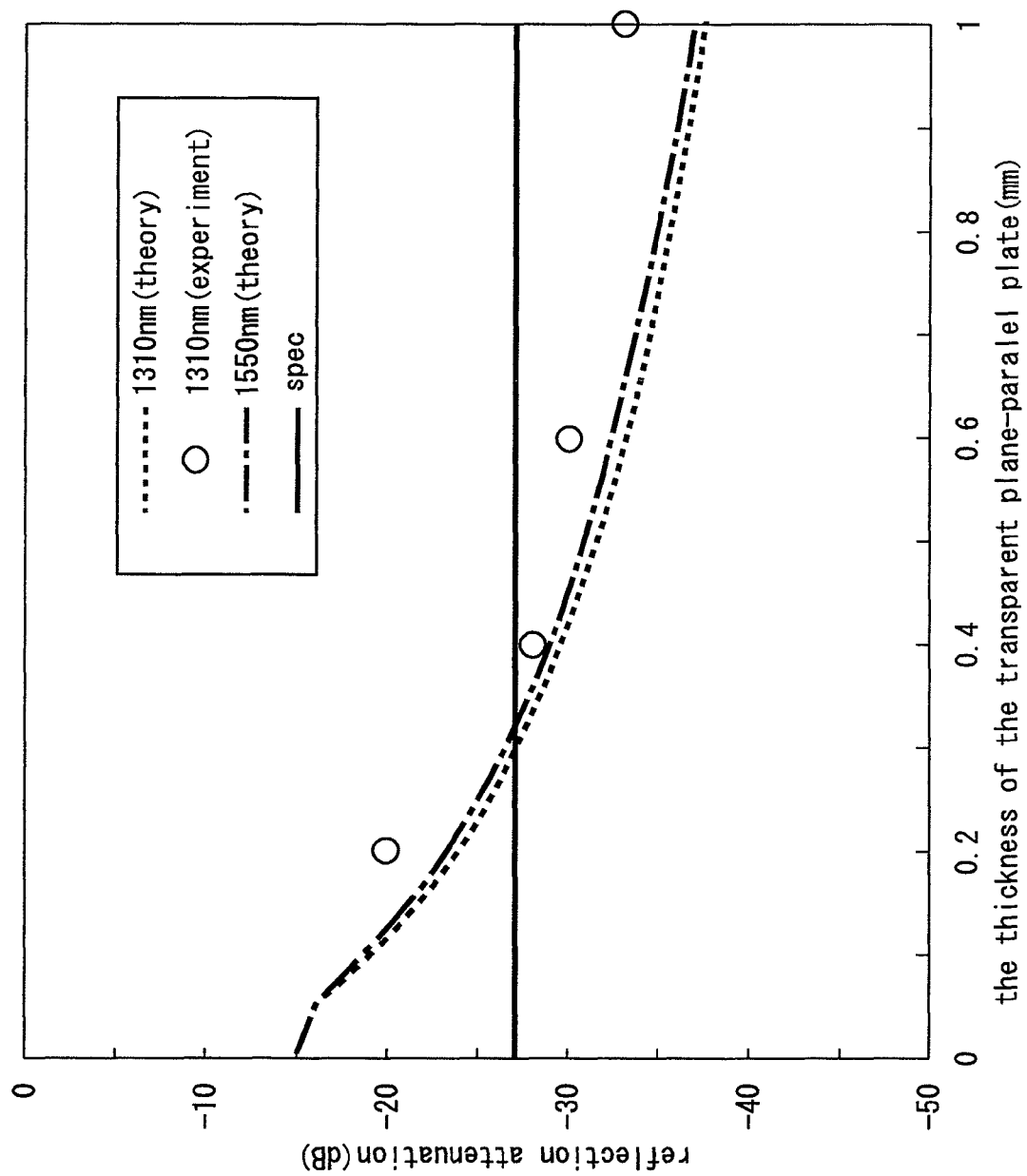
FIG. 2 is a diagram showing a dependence of the amount of reflection attenuation on the thickness of the transparent plane-parallel plate.

If the thickness of the transparent plane-parallel plate 18 is increased, the spread of light in the transparent plane-parallel plate 18 is increased. Therefore, increasing the thickness of the transparent plane-parallel plate 18 is effective in reducing return light. FIG. 2 is a diagram showing a dependence of the amount of reflection attenuation on the thickness of the transparent plane-parallel plate. An experiment and theory-based computation at a wavelength of 1310 nm and theory-based computation at a wavelength of 1550 nm were performed by selecting quartz glass as the material of the transparent plane-parallel plate and a single-mode fiber having a core diameter of 10 μm as the optical fiber. It was thereby found that low reflection as expressed by a reflection attenuation to −27 dB or less specified in the standard ITU-T 164.1 for long-distance transmission was enabled by setting the thickness of the transparent plane-parallel plate 18 to 0.4 mm or more. The same computation was performed with respect to wavelengths from 500 to 2000 nm to find substantially no wavelength dependence.

Second Embodiment

Figure 3:
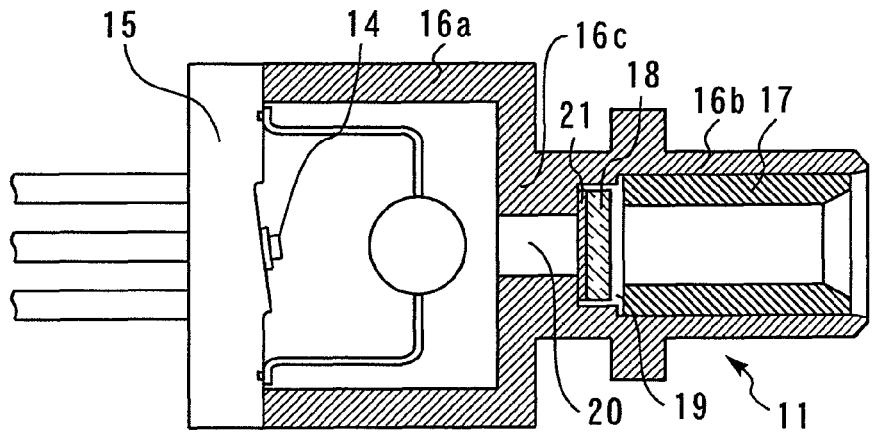
FIG. 3 is a sectional view of an optical receptacle according to a second embodiment of the present invention.

FIG. 3 is a sectional view of an optical receptacle according to a second embodiment of the present invention. A non-reflective coating film 21 of $SiO_2$, $Al_2O_3$ or the like is formed on the surface of the transparent plane-parallel plate 18 opposite from the surface to be brought into contact with the connector ferrule 13. The film thickness of the non-reflective coating film 21 is set to such a value that the reflectance is zero with respect to incident light, thus enabling a sufficient reduction in the amount of return light even when the thickness of the transparent plane-parallel plate 18 is 0.4 mm or less.

Third Embodiment

Figure 4:
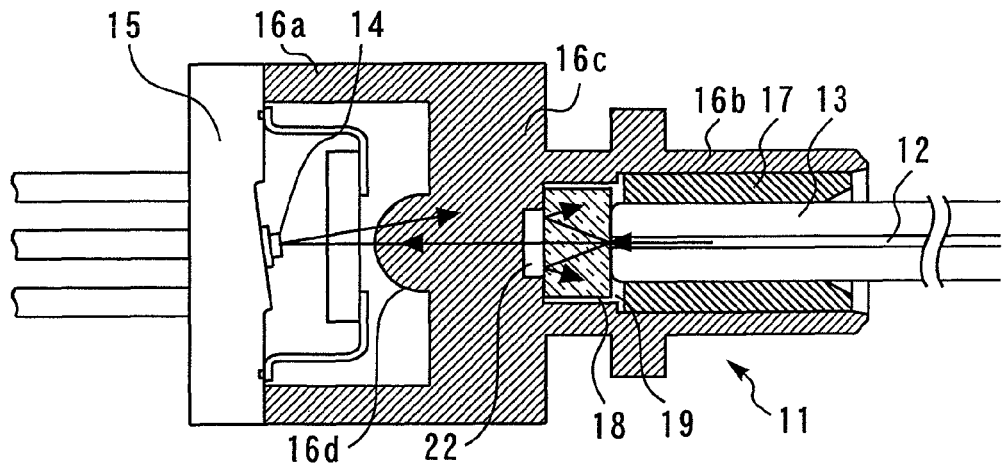
FIG. 4 is a sectional view of an optical receptacle according to a third embodiment of the present invention.

FIG. 4 is a sectional view of an optical receptacle according to a third embodiment of the present invention. The material of the receptacle body 16 is a transparent resin such as polyether imide. A lens 16*d* is formed in the partition portion 16*c* of the receptacle body 16. Through the lens 16*d*, light from the transparent plane-parallel plate 18 can be collected on the PD chip 14. The lens 16*d* is formed of a low-priced transparent resin to reduce the manufacturing cost.

If the tip end surface of the connector ferrule 13 is brought into direct contact with the receptacle body 16, the receptacle body is deformed (creeps). Therefore, even in a case where the material of the receptacle body 16 is a transparent resin, there is a need to provide the transparent plane-parallel plate 18 formed of a hard material such as quartz on the portion that the tip end of the connector ferrule 13 contacts.

When light passes through the plane of contact between the transparent plane-parallel plate 18 and the partition portion 16*c*, there is a possibility of occurrence of multiple reflection at the plane of contact. Therefore, in a surface of the partition portion 16*c* which contracts the transparent plane-parallel plate 18, a recess 22 having a diameter smaller than that of the outside shape of the transparent plane-parallel plate 18 is provided about an extension of the optical axis of the connector ferrule 13 inserted in the precise sleeve 17. Light traveling out of the optical fiber 12 in the connector ferrule 13 spreads in the transparent plane-parallel plate 18. The light is reflected at the interface between the air existing in the recess 22 and the transparent plane-parallel plate 18 due to the difference in refractive indices therebetween. The reflected light travels further outward from the optical axis. Thus, the amount of return of light to the transmitter side is reduced.

The receptacle body 16 formed of a transparent resin has the drawback of having low rigidity. Therefore the precise sleeve 17 formed of a rigid material such as zirconia is inserted to improve the rigidity of the receptacle body 16.

Fourth Embodiment

Figure 5:
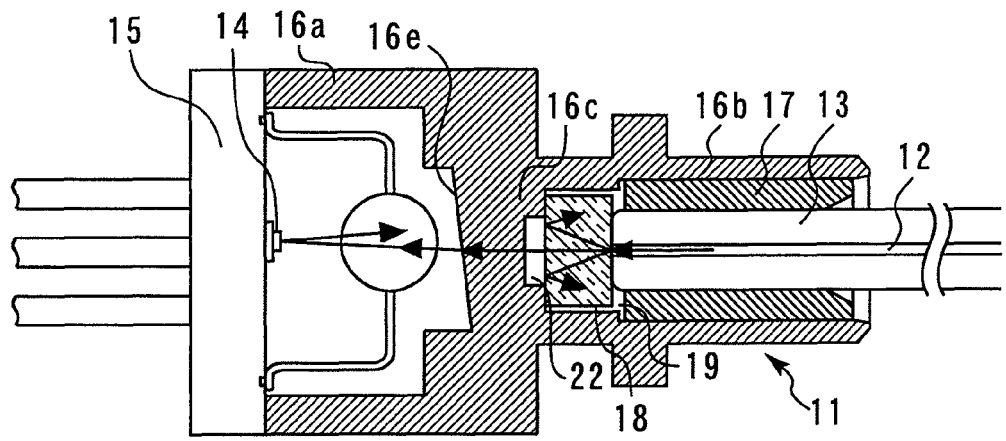
FIG. 5 is a sectional view of an optical receptacle according to a fourth embodiment of the present invention.

FIG. 5 is a sectional view of an optical receptacle according to a fourth embodiment of the present invention. The material of the receptacle body 16 is a transparent resin such as polyether imide. A slanting surface 16e is formed in the partition portion 16c of the receptacle body 16. In other respects, the construction is the same as that of the third embodiment. Light can be refracted toward the PD chip 14 by the slanting surface 16e, so that there is no need to obliquely mount the PD chip 14. Other effects similar to those of the third embodiment can be obtained.

Fifth Embodiment

Figure 6:
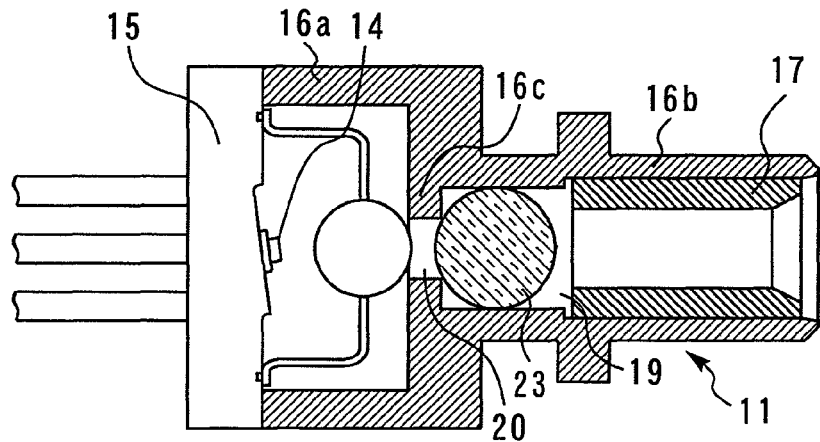
FIG. 6 is a sectional view of an optical receptacle according to a fifth embodiment of the present invention.

FIG. 6 is a sectional view of an optical receptacle according to a fifth embodiment of the present invention. A transparent spherical body 23 is used as a transparent member in place of the transparent plane-parallel plate 18. In other respects, the construction is the same as that of the first embodiment. Reflection of light can be reduced in comparison with the first embodiment by adjusting the radius of the transparent spherical body 23.

Sixth Embodiment

Figure 7:
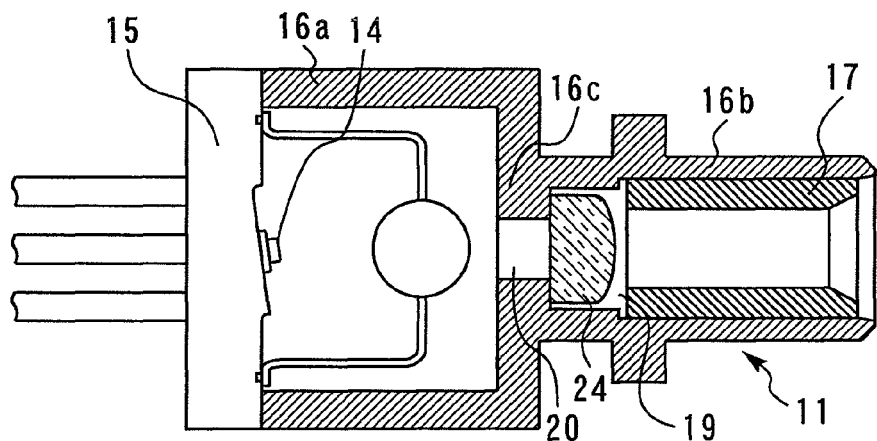
FIG. 7 is a sectional view of an optical receptacle according to a sixth embodiment of the present invention.

FIG. 7 is a sectional view of an optical receptacle according to a sixth embodiment of the present invention. A transparent spherical-convex body 24 is used as a transparent member in place of the transparent plane-parallel plate 18. In other respects, the construction is the same as that of the first embodiment. Reflection of light can be reduced in comparison with the first embodiment by adjusting the rounded shape of radius of the transparent spherical-convex body 24.

Seventh Embodiment

Figure 8:
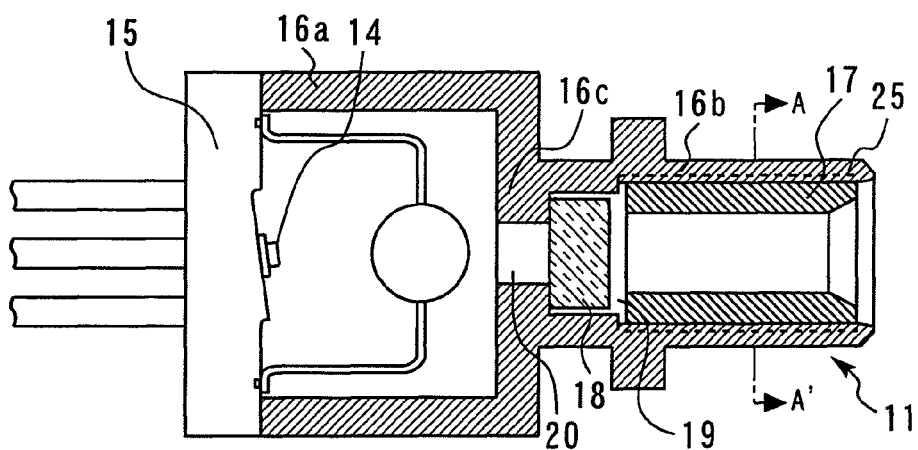
FIG. 8 is a sectional view of an optical receptacle according to a seventh embodiment of the present invention.
Figure 9:
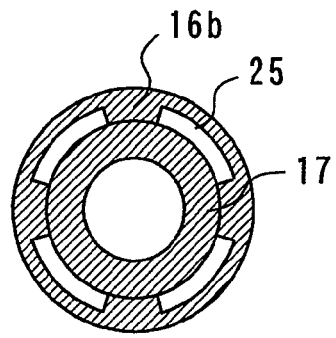
FIG. 9 is a sectional view taken along line A-A' in FIG. 8.

FIG. 8 is a sectional view of an optical receptacle according to a seventh embodiment of the present invention. FIG. 9 is a sectional view taken along line A-A' in FIG. 8. Channels 25 are formed in the inner wall surface of the cylindrical portion 16b of the receptacle body 16. The channels 25 serve as air outlet holes to facilitate insertion of the connector ferrule 13.

Also, the channels 25 may be filled with an adhesive to reinforce the force of bonding between the cylindrical portion 16b and the precise sleeve 17 while positioning of the cylindrical portion 16b and the precise sleeve 17 is being performed with portions other than the channels 25. The bonding thickness can be controlled by controlling the size of the channels 25. A deformation of the precise sleeve 17 due to thermal stress in the cylindrical portion 16b can be limited by designing the material of the adhesive and the size of the channels 25.

Figure 10:
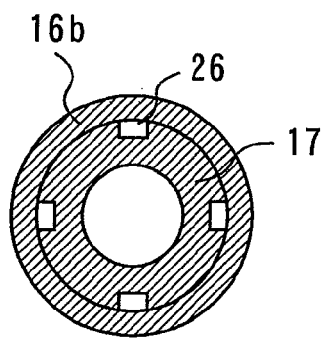
FIG. 10 is a sectional view of an optical receptacle according to a seventh embodiment of the present invention.

The channels 25 are formed in the inner wall surface of the cylindrical portion 16b in the above-described embodiment. However, the channels 25 are not exclusively used. Channels 26 may be formed in the outer wall surface of the precise sleeve 17, as shown in FIG. 10. The same effects are also obtained by using the channels 26.

Eighth Embodiment

Figure 11:
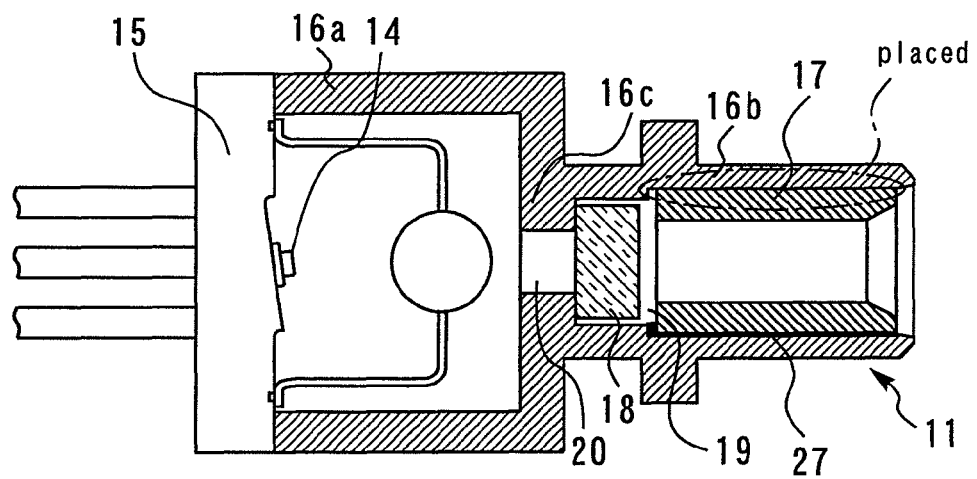
FIG. 11 is a sectional view of an optical receptacle according to an eighth embodiment of the present invention.

FIG. 11 is a sectional view of an optical receptacle according to an eighth embodiment of the present invention. A portion of the outer wall surface of the precise sleeve 17 is placed on the inner wall surface of the cylindrical portion 16b of the receptacle body 16 under pressure to position the precise sleeve 17. A gap is formed between a portion of the precise sleeve 17 not placed on the outer wall surface under pressure and the inner wall surface of the cylindrical portion 16b. This gap is filled with an adhesive 27 to bond the precise sleeve 17 and the cylindrical portion 16b to each other. In other respects, the construction is the same as that of the first embodiment. The inclination of the precise sleeve 17 with respect to the cylindrical portion 16b can be limited in this way, thereby enabling stable contact between the connector ferrule 13 inserted in the precise sleeve 17 and the transparent plane-parallel plate 18.

Ninth Embodiment

Figure 12:
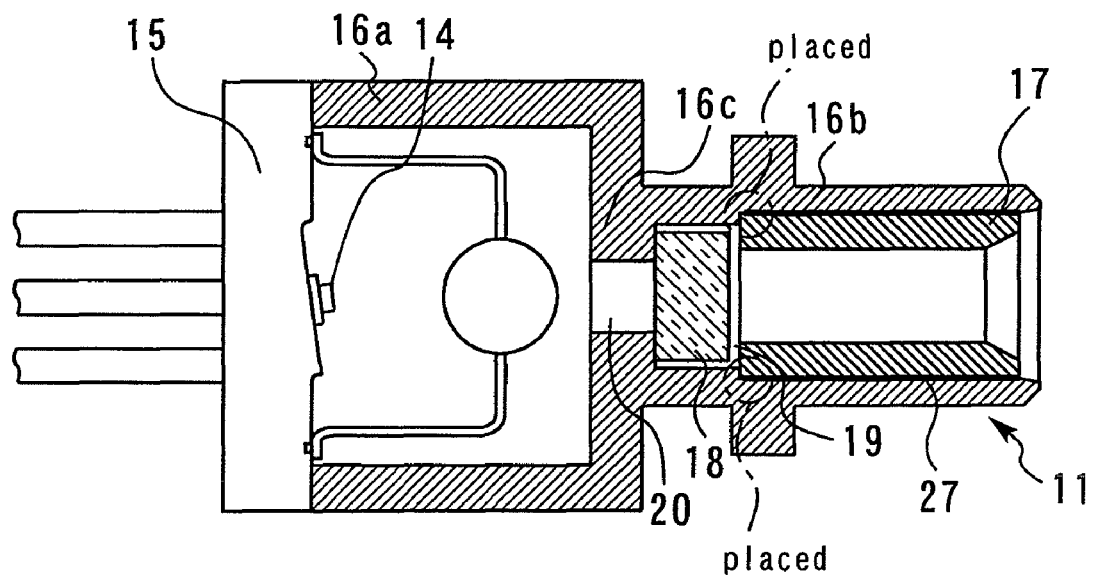
FIG. 12 is a sectional view of an optical receptacle according to a ninth embodiment of the present invention.

FIG. 12 is a sectional view of an optical receptacle according to a ninth embodiment of the present invention. The tip end surface of the precise sleeve 17 is placed on the receptacle body 16 under pressure to position the precise sleeve 17. Also, a gap formed between the outer wall surface of the precise sleeve 17 and the inner wall surface of the cylindrical portion 16b is filled with an adhesive 27 to bond the precise sleeve 17 and the cylindrical portion 16b to each other. In other respects, the construction is the same as that of the first embodiment. The inclination of the precise sleeve 17 with respect to the cylindrical portion 16b can be limited in this way, thereby enabling stable contact between the connector ferrule 13 inserted in the precise sleeve 17 and the transparent plane-parallel plate 18.

Tenth Embodiment

Figure 13:
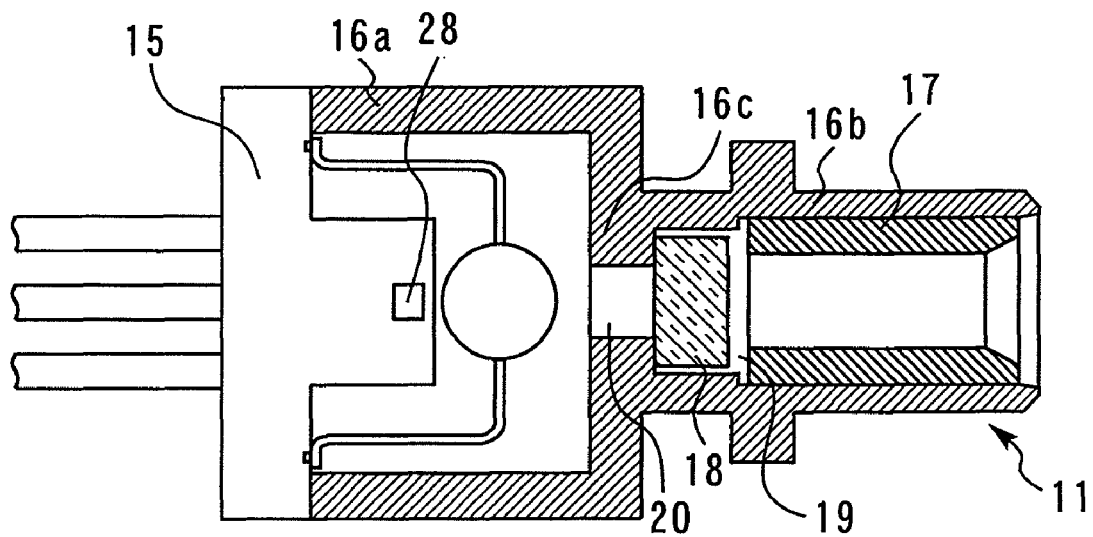
FIG. 13 is a sectional view of an optical receptacle according to a tenth embodiment of the present invention.

FIG. 13 is a sectional view of an optical receptacle according to a tenth embodiment of the present invention. An LD chip 28 is mounted in place of the PD chip 14 in the optical semiconductor package 15. In other respects, the construction is the same as that of the first embodiment. The construction of this embodiment enables reducing the reflection of light from the LD chip 28 at the plane of contact between the transparent plane-parallel plate 18 and the connector ferrule 13 and improving the electro-optical characteristics and reliability of the optical receptacle by controlling return light to the LD chip 28. It is also possible to limit the amount of return of light entering from the system side via the connector ferrule 13, reflected by the tip end surface of the connector ferrule 13 and returned to the system side.

In the optical receptacle according to any one of the above-described second to ninth embodiments, the LD chip 28 may be mounted in place of the PD chip 14. In such a case, the effects of one of the second to ninth embodiments can be obtained in addition to the effects of the tenth embodiment.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2008-106901, filed on Apr. 16, 2008 including specification, claims, drawings and summary, on which the Convention priority of the present application is based, are incorporated herein by reference in its entirety.

What is claimed is:

1. An optical assembly optically coupling an optical fiber and an optical semiconductor device, the optical assembly comprising:
    an optical semiconductor package housing the optical semiconductor device;
    a connector ferrule in which an end of the optical fiber is mounted;
    a precise sleeve having an inside diameter and within which the connector ferrule is located;
    a one-piece receptacle body including
        a connection portion connected to the optical semiconductor package,
        a tubular portion in which the precise sleeve is located, and
        a partition portion located between and connecting the connection portion to the tubular portion; and
    a transparent member having an outside diameter larger than the inside diameter of the precise sleeve and confined within a region within the tubular portion between the precise sleeve and the partition portion, by the partition portion and the connector ferrule, wherein the optical semiconductor device has an optical axis and is mounted on the optical semiconductor package so that the optical axis of the optical semiconductor device is aligned with a central axis of the tubular portion.

2. The optical assembly according to claim 1, wherein the partition portion includes an opening having a central axis aligned with a central optical axis of the connector ferrule located in the precise sleeve.

3. The optical assembly according to claim 1, wherein the transparent member is a plate having opposed planar surfaces that are parallel to each other.

4. The optical assembly according to claim 1, wherein the transparent member and the optical fiber are the same material.

5. The optical assembly according to claim 1, wherein the partition portion has a surface perpendicular to the central axis of the tubular portion.

6. The optical assembly according to claim 1, wherein the transparent member has a thickness of at least 0.4 mm.

7. The optical assembly according to claim 1, wherein the transparent member includes opposed first and second surfaces and further comprising a non-reflective coating film on the first surface of the transparent member, wherein the second surface of the transparent member is in contact with the connector ferrule.

8. The optical assembly according to claim 1, wherein the receptacle body is transparent.

9. The optical assembly according to claim 8, wherein the partition portion has a surface contacting the transparent member and the surface includes a recess having a central optical axis aligned with a central optical axis of the connector ferrule.

10. The optical assembly according to claim 1, wherein the transparent member is spherical.

11. The optical assembly according to claim 1, wherein the transparent member has opposed first and second surfaces, the first surface is planar, and the second surface is convex.

12. The optical assembly according to claim 1, including a longitudinal channel in one of (i) an inner wall surface of the tubular portion of the receptacle body and (ii) an outer wall surface of the precise sleeve, for assisting insertion of the precise sleeve into the tubular portion.

13. The optical assembly according to claim 1, wherein a portion of an outer wall surface of the precise sleeve contacts an inner wall surface of the tubular portion of the receptacle body under pressure.

14. The optical assembly according to claim 1, wherein a tip end surface of the precise sleeve contacts the receptacle body under pressure.

15. The optical assembly according to claim 1, wherein the optical semiconductor device is a photodiode chip mounted in the optical semiconductor package.

16. The optical assembly according to claim 1, wherein the optical semiconductor device is a laser diode chip mounted in the optical semiconductor package.

* * * * *